United States Patent
Johnson

(10) Patent No.: US 12,179,940 B2
(45) Date of Patent: Dec. 31, 2024

(54) SPACECRAFT TRASH DISPOSAL APPARATUS AND METHOD

(71) Applicant: REPRISE SPACE SOLUTIONS, LLC, Houston, TX (US)

(72) Inventor: Michael David Johnson, Houston, TX (US)

(73) Assignee: REPRISE SPACE SOLUTIONS, LLC, Houston, TX (US)

( * ) Notice: Subject to any disclaimer, the term of this patent is extended or adjusted under 35 U.S.C. 154(b) by 113 days.

(21) Appl. No.: 17/493,554

(22) Filed: Oct. 4, 2021

(65) Prior Publication Data

US 2022/0106062 A1 Apr. 7, 2022

Related U.S. Application Data

(60) Provisional application No. 63/087,248, filed on Oct. 4, 2020.

(51) Int. Cl.
*B64G 1/60* (2006.01)
*B65F 1/14* (2006.01)

(52) U.S. Cl.
CPC .............. *B64G 1/60* (2013.01); *B65F 1/1442* (2013.01)

(58) Field of Classification Search
None
See application file for complete search history.

(56) References Cited

U.S. PATENT DOCUMENTS

| | | | | |
|---|---|---|---|---|
| 3,807,656 A | * | 4/1974 | Fletcher | B64G 1/12 244/171.7 |
| 5,242,134 A | * | 9/1993 | Petro | B64G 1/62 244/158.1 |
| 2009/0005747 A1 | * | 1/2009 | Michaels | A61M 1/604 604/319 |
| 2016/0115052 A1 | * | 4/2016 | Morrison | C02F 1/78 210/202 |

* cited by examiner

*Primary Examiner* — Joshua J Michener
*Assistant Examiner* — Arfan Y. Sinaki
(74) *Attorney, Agent, or Firm* — HULSEY P.C.

(57) ABSTRACT

A spacecraft trash disposal apparatus and method are disclosed. The spacecraft trash disposal apparatus includes an airlock, an inflatable trash enclosure holding trash, and a pressure regulating system. The spacecraft trash disposal apparatus permits wet and dry trash to be transported from the inside of a spacecraft via the inflatable trash enclosure holding the trash. The inflatable trash enclosure is ejected to the surrounding vacuum of space without causing trash or liquids to escape from the inflatable trash enclosure. The pressure regulating system permits reduction of pressure inside the inflatable trash enclosure from typically atmospheric to a lower pressure while the airlock is depressurizing without going to a full vacuum. This lower pressure is such that, at a given temperature, the liquid trash is prevented from boiling. The lower pressure permits a lightweight inflatable trash enclosure for low cost spacecraft trash disposal.

8 Claims, 4 Drawing Sheets

SPACECRAFT TRASH DISPOSAL APPARATUS AND METHOD

CROSS-REFERENCE TO RELATED APPLICATIONS

The present application claims priority from U.S. Provisional Patent Application Ser. No. 63/087,248 filed on Oct. 4, 2020, which is incorporated herein by its entirety and referenced thereto.

FIELD OF INVENTION

The present disclosure relates generally to a spacecraft trash disposal apparatus and method consisting of an airlock, an ejection system, an inflatable trash enclosure holding trash, and a pressure regulating system (or pressure regulating vent) that permits wet and dry trash to be transported from the inside of a spacecraft via the inflatable trash enclosure holding trash and ejected to the surrounding vacuum of space without causing trash or liquids to escape from the inflatable trash enclosure. The pressure regulating system permits reduction of pressure inside the inflatable trash enclosure from typically atmospheric to a lower pressure while the airlock is depressurizing without going to a full vacuum. This lower pressure is such that, at a given temperature, the liquid trash is prevented from boiling. The lower pressure permits a lightweight inflatable container or trash enclosure for low cost spacecraft trash disposal.

BACKGROUND

Generation of trash (e.g. wastepaper, towels, clothing, urine, feces, vomitus, etc.) is a common occurrence on human tended orbiting space stations. It is a particularly vexing problem to deal with as some of the trash generated (e.g. urine, feces, vomitus) is potentially hazardous or toxic to human life, if not removed from the closed habitable volume of the spacecraft.

Previous spacecraft have used trash airlocks typically consisting of a depressurizable volume with one or more hatches that permit crew to load trash into the airlock, evacuate the airlock and eject the trash into the vacuum of space. This method was used on the Soviet Salyut and later Mir space stations. It had a series of drawbacks that included having to place any liquids or wet trash into a pressure-containing enclosure to prevent contamination of the outside of the space station. In addition, these trash airlocks distributed loose trash in the orbit of the space station causing a space debris problem.

Another method of space station trash containment has been to store the generated trash on board the space station (e.g. Skylab) in a large but separated volume. This method is generally not practical unless an extremely large volume is available. For example, Skylab was occupied by humans for a total of 171 days (513 man-days) and generated enough trash to fill a 2,588-cubic-foot volume.

The present method of space station trash disposal (utilized by Salyut, Mir and the International Space Station) is to fill departing cargo spacecraft with trash. In the case of the cargo spacecraft being a reentry vehicle (e.g. Russian Soyuz, SpaceX Dragon), this method has the disadvantage of displacing valuable return to Earth payload volume with trash not to mention the cost of propellant use (for retro rocket operation) as well as recovery costs. In the case of destructive reentry cargo spacecraft (e.g. Northrop Grumman Cygnus vehicle, NASDA HTV, Russian Progress) the spacecraft is loaded with trash prior to its departure and destructively reentered into the Earth's atmosphere. The problem with this method is that the volume of trash generated generally exceeds the volume of cargo transported to the space station and the departing cargo spacecraft (which may cost in excess of $170 million) could be used for much more valuable purposes than simply trash disposal.

Other trash disposal methods have been proposed such as disposing of a vented bag in an airlock. This method still has the drawback of requiring liquids or wet trash to be contained in a pressure holding volume. Even small volumes of liquid would require a pressure vessel capable of holding atmospheric pressure without exploding during the airlock decompression process. If any of the liquids are released inside the airlock or after departure from the space station it could cause contamination and or damage to the space station or other spacecraft in the vicinity of the airlock. Loose liquids or vapors could cause optical equipment contamination thus permanently destroying these expensive components.

Currently, there is no way to efficiently and safely eject large amounts of wet trash from a space station without utilization of a fully pressurized spacecraft.

The disclosed subject matter helps to avoid these and other problems.

SUMMARY

This disclosure relates generally to a spacecraft trash disposal apparatus and method consisting of an airlock, an ejection system, an inflatable trash enclosure holding trash, and a pressure regulating system that permits wet and dry trash to be transported from the inside of a spacecraft via the inflatable trash enclosure holding trash to be ejected to the surrounding vacuum of space without causing trash or liquids to escape from the inflatable trash enclosure. The pressure regulating system permits reduction of pressure inside the inflatable trash enclosure from typically atmospheric to a lower pressure while the airlock is depressurizing without going to a full vacuum. This lower pressure is such that, at a given temperature, the liquid trash is prevented from boiling. For example, water (the typical liquid waste product) will boil at 90° F. at a pressure of 0.6987 psi. The lower pressure permits a lightweight inflatable container structure for low cost spacecraft trash disposal. An inflatable pressure vessel would have to be considerably heavier and stronger to handle 1 atmosphere (14.7 psi) pressure usually thought to be required to perform such a function. A similar principle is used in space suits where the minimum 100% oxygen pressure is used to sustain human life (approximately 4.7 psi) to minimize the space suit structural mass while preventing the crewmember's bodily fluids from boiling.

The main advantage of using the invention is the provision of a novel means of disposing of spacecraft trash through a lightweight pressure controlled large volume spacecraft trash disposal apparatus to dispose of wet trash and waste liquids, minimize space station contamination, minimize space debris, minimize disposal apparatus weight and minimize trash disposal cost.

BRIEF DESCRIPTION OF THE DRAWINGS

A more complete understanding of the invention and the many attendant advantages thereof will be readily appreciated as the same becomes better understood by reference to the following detailed description, when considered in connection with the accompanying drawings wherein.

DESCRIPTION OF THE PREFERRED EMBODIMENT

In one embodiment, the apparatus of the invention includes a Spacecraft Trash Disposal Apparatus and Method that includes, an airlock, an ejection system, a lightweight, inflatable enclosure with at least one resealable hatch, and a pressure regulator system attached to the inflatable enclosure.

Figure 1:
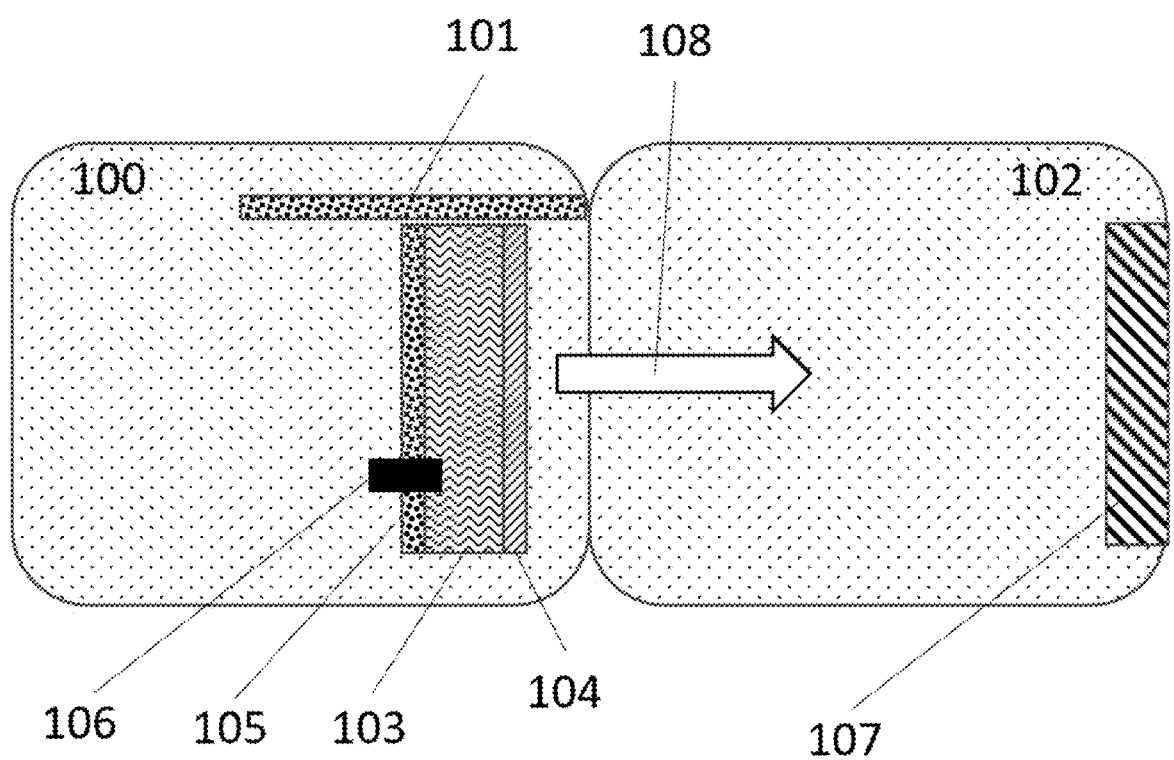
FIG. 1 is a diagrammatic view of the first step of the method and apparatus.

In FIG. 1, the apparatus of the invention includes a spacecraft trash disposal apparatus and method that includes, a space station volume 100, a space station hatch 101, an airlock volume or airlock 102, an inflatable trash bag or trash enclosure or container 103 (in a collapsed state), an inflatable trash bag end closure 104, a resealable trash bag hatch or resealable hatch 105, a vent with a pressure regulator 106 (or pressure regulated system or pressure regulator vent) and an ejector mechanism 107. Crewmembers move (in direction 108) collapsed trash bag assembly 103/104/105/106 from space station volume 100 into airlock volume 102 and attach inflatable trash bag end closure 104 to ejector mechanism 107.

Figure 2:
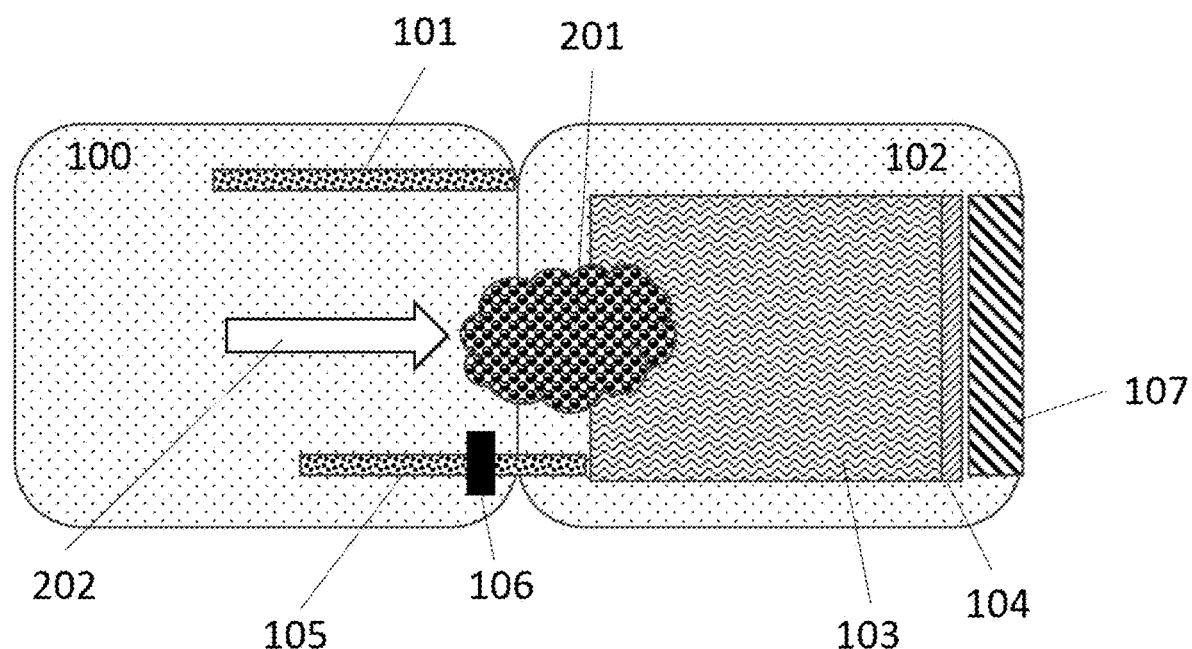
FIG. 2 is a diagrammatic view of the second step of the method and apparatus.

In FIG. 2, inflatable trash bag 103 is extended. Resealable trash bag hatch 105 is opened and trash 201 is moved in direction 202 into inflatable trash bag 103.

Figure 3:
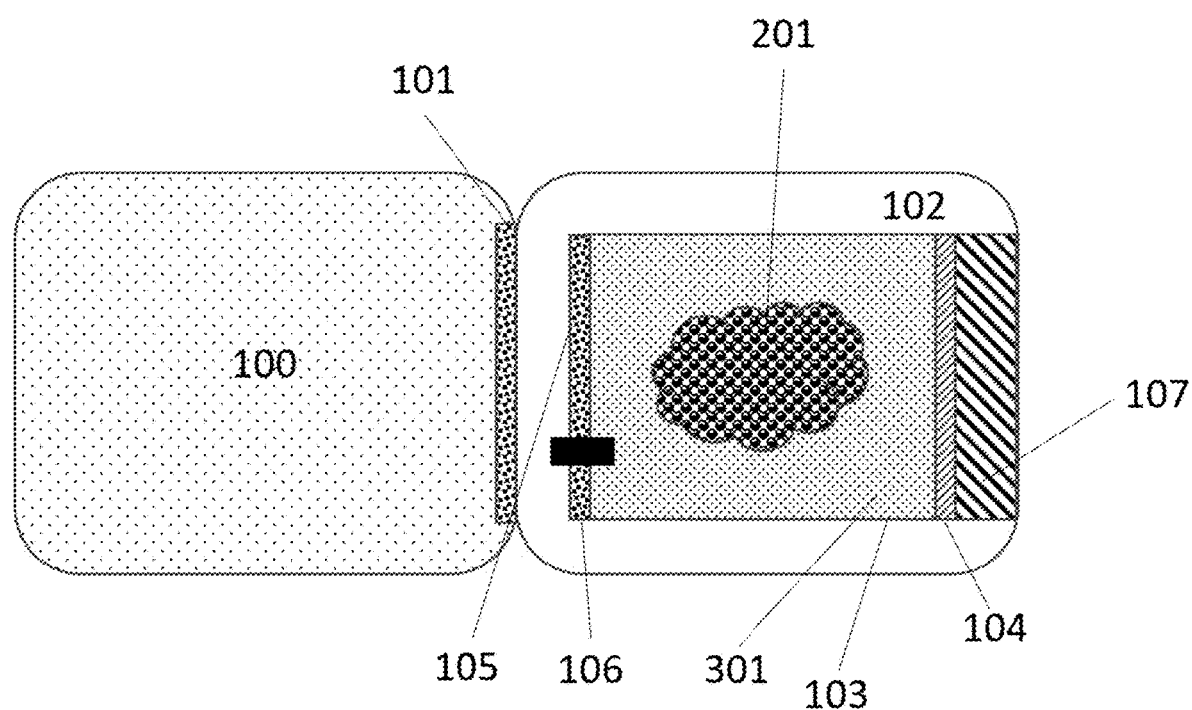
FIG. 3 is a diagrammatic view of the third step of the method and apparatus.

In FIG. 3, resealable trash bag hatch 105 is closed once the desired amount of trash 201 has been placed in inflatable trash bag 103. Next, space station hatch 101 is closed and airlock volume 102 is depressurized using well known methods in the art (e.g. venting to vacuum, using a vacuum pump, etc.). As the atmosphere is removed from airlock volume 102, pressure regulated system 106 vents the atmosphere from volume 301 to airlock volume 102. When the desired minimum fluid vapor pressure is reached to prevent fluid boiling for a given temperature, regulated vent 106 stops venting atmosphere to airlock volume 102. The pressure differential between inflatable trash bag volume 301 and the eventual vacuum in airlock volume 102 causes inflatable trash bag 103 to become rigid. This lower pressure in volume 301 is readily maintained by a relatively lightweight pressure enclosure formed by inflatable trash bag 103 (in an inflated state), inflatable trash bag end closure 104, resealable trash bag hatch 105, and closed vent 106. A liquid trap filter can be inserted into vent 106 using well known means in the art to prevent contaminating liquids from escaping from inflatable trash bag volume 301 into airlock volume 102 during depressurization. Regulated vent 106 may be composed of any number of redundant regulated vents to ensure exceptionally reliable operation.

Figure 4:
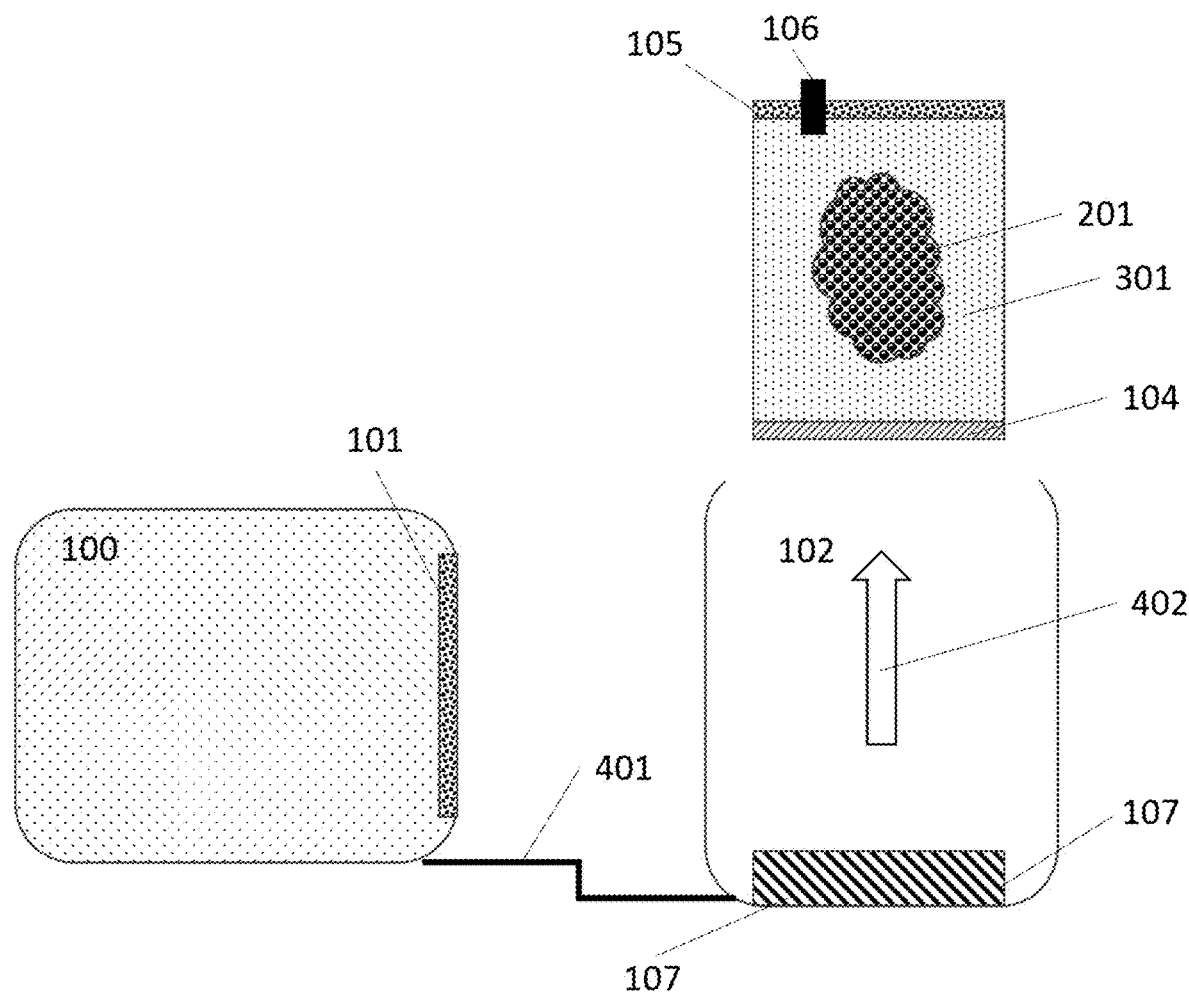
FIG. 4 is a diagrammatic view of the fourth step of the method and apparatus.

In FIG. 4, airlock volume 102 (this is a "bell jar" version airlock) is removed by robotic arm 401 and moved to a location permitting ejection (via ejection mechanism 107) of now inflated trash bag assembly 103/104/105/106 in direction 402. Any other airlock system may be utilized with this system as is well known in the art (e.g. a two-hatch airlock). Ejection mechanism 107 can use any method known on the art (e.g. springs, magnetic repulsion, pneumatic bladder, hydraulics, cold gas thrusters, rocket motors, etc.) to eject inflated trash bag assembly 103/104/105/106 into free space without contaminating space station 100 nor creating a space debris problem. The large surface area of inflated trash bag assembly 103/104/105/106 provides aerodynamic drag (in the case of Low Earth Orbit or approximately 400 km altitude orbit) to cause inflated trash bag assembly 103/104/105/106 to eventually destructively reenter the Earth's atmosphere and vaporize completely. Inflated trash bag assembly 103/104/105/106 is large enough and may contain metal foil reflectors to be readily tracked by ground-based radar to prevent any potential collision events by the disposed trash.

It will be apparent to those skilled in the art that various modifications and variations can be made in the present disclosure without departing from the scope or spirit of the disclosure. Other embodiments of the disclosure will be apparent to those skilled in the art from consideration of the specification and practice of the disclosure disclosed herein. It is intended that the specification and examples be considered as exemplary only, with a true scope and spirit of the disclosure being indicated by the following claims.

What is claimed is:

1. A spacecraft trash disposal apparatus, comprising:
    a first airlock and a second airlock, wherein said first airlock and said second airlock connect via a space station hatch;
    a trash enclosure;
    a resealable hatch connected to said trash enclosure; and
    a pressure regulated system connected to said trash enclosure,
    wherein said first airlock is configured to receive said trash enclosure in a collapsed state, wherein said trash enclosure is configured to move from said first airlock to said second airlock, wherein said trash enclosure is configured to inflate in said second airlock opening by closing said resealable hatch, wherein said trash enclosure is configured to receive a desired amount of trash in an inflated state, wherein said space station hatch is configured to close, wherein said resealable hatch is configured to close and enclose the trash in said trash enclosure in the inflated state, and
    wherein said pressure regulated system limits an internal pressure of said trash enclosure in the inflated state to a minimum pressure during depressurization of said second airlock.

2. The spacecraft trash disposal apparatus of claim 1, wherein said second airlock comprises an ejector mechanism to eject said trash enclosure in the inflated state.

3. The spacecraft trash disposal apparatus of claim 1, wherein said minimum pressure is selected to prevent liquids from boiling at an operational temperature of the spacecraft trash disposal apparatus.

4. A method of providing a spacecraft trash disposal apparatus, said method comprising steps of:
    providing an airlock;
    proving a trash enclosure;
    loading said trash enclosure with trash;
    providing a pressure regulated system at said trash enclosure;
    placing said trash enclosure in said airlock;
    depressurizing said airlock; and
    regulating an internal pressure of said trash enclosure by said pressure regulated system to a minimum pressure during depressurization of said airlock for preventing contained liquids from boiling in said trash enclosure.

5. The method of claim 4, further comprising ejecting said trash enclosure from said airlock.

6. The method of claim 4, further comprising inflating said trash enclosure for loading the trash.

7. The method of claim 4, further comprising providing at least one resealable hatch at said trash enclosure.

8. The method of claim 7, further comprising opening and closing said at least one resealable hatch for receiving a desired amount of the trash.

* * * * *